US012244706B2

(12) United States Patent
Bang et al.

(10) Patent No.: US 12,244,706 B2
(45) Date of Patent: Mar. 4, 2025

(54) METHOD OF SECURELY COMMUNICATING DATA

(71) Applicant: UNIONPLACE CO., LTD., Seoul (KR)

(72) Inventors: Seongcheol Bang, Seoul (KR); Youngkyu Shin, Seoul (KR); Seunggyeom Kim, Seoul (KR); Siwan Noh, Seoul (KR); Jaecheol Ryu, Seoul (KR)

(73) Assignee: UNIONPLACE CO., LTD., Seoul (KR)

( * ) Notice: Subject to any disclaimer, the term of this patent is extended or adjusted under 35 U.S.C. 154(b) by 205 days.

(21) Appl. No.: 18/306,107

(22) Filed: Apr. 24, 2023

(65) Prior Publication Data

US 2023/0261862 A1 Aug. 17, 2023

Related U.S. Application Data (63) Continuation of application No. PCT/KR2022/014649, filed on Sep. 29, 2022.

(30) Foreign Application Priority Data

Dec. 13, 2021 (KR) .................. 10-2021-0177256

(51) Int. Cl.
*H04L 9/06* (2006.01)
*H04L 9/08* (2006.01)

(52) U.S. Cl.
CPC .............. *H04L 9/0869* (2013.01); *H04L 9/06* (2013.01); *H04L 9/0816* (2013.01)

(58) Field of Classification Search
CPC ........ H04L 9/0869; H04L 9/06; H04L 9/0816
(Continued)

(56) References Cited

U.S. PATENT DOCUMENTS

| 7,093,129 B1 * | 8/2006 | Gavagni ............... H04L 9/3263 713/153 |
| 8,086,535 B2 * | 12/2011 | Zweig ..................... H04L 63/10 705/53 |

(Continued)

FOREIGN PATENT DOCUMENTS

| KR | 10-0838556 B1 | 6/2008 |
| KR | 10-2010-0067584 A | 6/2010 |

(Continued)

OTHER PUBLICATIONS

Korean Office Action mailed Jan. 29, 2022, issued to Korean Application No. 10-2021-0177256.

(Continued)

Primary Examiner — Thanh T Le
(74) Attorney, Agent, or Firm — Stein IP, LLC (57) ABSTRACT

According to one aspect of the technique of the present disclosure, there is provided a method for securely communicating data. The method includes: (a) establishing a first encryption scheme, a data integrity checking scheme, an encryption key and an authentication key through a communication connection with a receiver; (b) generating a random key; (c) generating secure data including random key information obtained by encrypting the random key using the encryption key and the first encryption scheme; authentication information generated based on the random key, the data integrity checking scheme and the authentication key; and data information obtained by encrypting data using the random key and a second encryption scheme whose operation load is lower than that of the first encryption scheme; and (d) transmitting the secure data to the receiver.

18 Claims, 5 Drawing Sheets

(58) Field of Classification Search
USPC .......................................................... 380/46
See application file for complete search history.

(56) References Cited

U.S. PATENT DOCUMENTS

| | | | | |
|---|---|---|---|---|
| 11,748,494 | B2* | 9/2023 | Erden .................... | H04L 9/0819 380/30 |
| 2008/0162948 | A1* | 7/2008 | Choi ..................... | H04L 9/0866 713/193 |
| 2009/0031139 | A1* | 1/2009 | Geoffrey ............... | H04L 9/3231 713/186 |
| 2009/0316900 | A1* | 12/2009 | Qiu ........................ | H04L 9/083 380/258 |
| 2011/0099369 | A1* | 4/2011 | Lee ....................... | H04L 9/3263 713/165 |
| 2014/0355757 | A1* | 12/2014 | Shrivastava .......... | H04L 9/0822 380/46 |
| 2015/0350170 | A1* | 12/2015 | Roselle .................. | G09C 5/00 713/171 |
| 2016/0182231 | A1* | 6/2016 | Fontecchio ........... | H04L 9/3239 713/172 |
| 2017/0013453 | A1* | 1/2017 | Lee ....................... | H04W 12/037 |
| 2018/0254892 | A1* | 9/2018 | Egorov ................. | H04L 9/0891 |
| 2024/0267963 | A1* | 8/2024 | He ........................ | H04W 76/10 |

FOREIGN PATENT DOCUMENTS

| | | |
|---|---|---|
| KR | 10-2010-0083840 A | 7/2010 |
| KR | 10-2011-0098024 A | 9/2011 |
| KR | 10-2011-0108071 A | 10/2011 |
| KR | 10-2016-0069432 A | 6/2016 |
| KR | 10-1689351 B1 | 12/2016 |
| KR | 10-2019-0080299 A | 7/2019 |
| KR | 10-2012037 B1 | 8/2019 |
| KR | 10-2406252 B1 | 6/2022 |

OTHER PUBLICATIONS

International Search Report mailed Jan. 5, 2023, issued to International Application No. PCT/KR2022/014649.

* cited by examiner

<PRIOR ART>

METHOD OF SECURELY COMMUNICATING DATA

CROSS-REFERENCE TO RELATED PATENT APPLICATION

This non-provisional U.S. patent application is a bypass continuation application of PCT International Application No. PCT/KR2022/014649, filed on Sep. 29, 2022, in the WIPO, the international application being based upon and claiming the benefit of priority from Korean Patent Application No. 10-2021-0177256, filed on Dec. 13, 2021, in the Korean Intellectual Property Office, the entire contents of which are hereby incorporated by reference.

BACKGROUND

1. Field

The present disclosure relates to a method for securely communicating data.

The technique disclosed herein was supported by Institute for Korea Technology and Information Promotion Agency for SMEs (TIPA) grant funded by the Korea government (the Ministry of SMEs and Startups (MSS, Korea)) (Project name: "Development of fusion algorithm-based network security module for UHD (4K, 8K) real-time image encryption processing," Project No.: 1425175457).

2. Related Art

A real-time transport protocol (hereinafter referred to as "RTP") is a network protocol that is used to transmit data (e.g., multimedia data) in real-time over a network (e.g., the Internet). For example, RTP may be used for real-time transmission of data in network services such as multicast network services and unicast network services. More specifically, RTP can be applied to systems such as CCTV systems, video conference systems and video streaming systems, for example.

An RTP packet may include an RTP header and a payload.

The RTP header includes version information, information about the presence or absence of a padding byte, a sequence number, a time stamp and information about a payload type.

The RTP payload indicates actually transmitted data such as the multimedia data.

Meanwhile, in order to securely transmit data, more specifically, to encrypt data, authenticate messages and defend against retransmission attacks, a secured RTP (hereinafter referred to as "SRTP") may be used.

For example, the technique of SRTP is disclosed in Korean Patent Application Publication No. 10-2016-0069432 (Patent Document 1).

Figure 7:
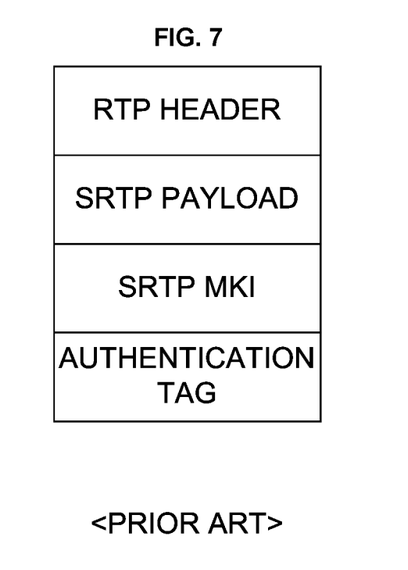
FIG. 7 is a diagram illustrating an example of an SRTP packet.

FIG. 7 is a diagram illustrating an example of an SRTP packet.

Referring to FIG. 7, the SRTP packet may include an RTP header, an SRTP payload, an SRTP master key index (MKI) and an authentication tag.

The RTP header includes version information, information about the presence or absence of a padding byte, a sequence number, a time stamp and information about a payload type.

The SRTP payload indicates actually transmitted data such as the multimedia data. The SRTP payload is encrypted.

The SRTP MKI is index information indicating a master key to be used for decryption when multiple master keys are required to decrypt the SRTP packet. The SRTP MKI may not be included in the SRTP packet depending on the implementation.

The authentication tag is information for authenticating the integrity of the SRTP packet.

The authentication tag and the SRTP MKI may be used to authenticate the integrity of the SRTP packet or the integrity of the SRTP payload included in the SRTP packet.

In the following descriptions, the description of the SRTP MKI will be omitted.

Hereinafter, a process for transmitting and receiving data using the SRTP packet between an apparatus for transmitting data (hereinafter referred to as a "transmitter") and an apparatus for receiving data (hereinafter referred to as a "receiver") will be described by way of example.

The transmitter establishes a connection with the receiver by using, for example, a transport layer security (TLS) protocol. For example, a key exchange/agreement scheme, an authentication scheme, an encryption scheme and a data integrity checking scheme are established between the transmitter and the receiver.

Meanwhile, the transmitter and the receiver may exchange an authentication key and an encryption key in a bearer-setup process.

The key exchange/agreement scheme is used to exchange keys over a network. For example, protocols such as Rivest-Shamir-Adleman (RSA) and Diffie-Hellman Ephemeral (DHE) may be used.

The authentication scheme is used to authenticate a key. For example, protocols such as RSA and Digital Signature Algorithm (DSA) may be used.

The encryption scheme is used to encrypt and decrypt data. For example, protocols such as Advanced Encryption Standard (AES), Data Encryption Standard (DES) and International Data Encryption Algorithm (IDEA) may be used.

The data integrity checking scheme is used to authenticate data. For example, protocols such as Secure Hash Algorithm (SHA) and message-digest algorithm (MD5) may be used.

Next, the transmitter generates an authentication tag from the RTP header and the RTP payload by using the authentication key and the authentication function. The transmitter also generates the SRTP payload by encrypting the RTP payload using the encryption key and the encryption/decryption function.

Next, the transmitter generates the SRTP packet based on the RTP header, the SRTP payload and the authentication tag.

Next, the transmitter transmits the SRTP packet to the receiver.

Upon receiving the SRTP packet, the receiver generates authentication information by using the authentication key and the authentication function, and performs authentication by comparing the authentication information with the authentication tag included in the SRTP packet.

If the authentication is successfully completed, the receiver decrypts the SRTP payload included in the SRTP packet by using the encryption key and the encryption/decryption function to generate the RTP payload.

As such, since a high-level encryption method is used in SRTP, the security level of SRTP is very high. However, due to the high level of encryption and the large amount of data, SRTP is limited to the cases where the transmitter and the receiver have high processing power (e.g., high-level hardware and software specifications). Further, since SRTP increases network traffic, 1:1 communication is most often performed between the transmitter and the receiver.

For example, in the case where a CCTV system includes multiple internet protocol (IP) cameras and a server and each of the multiple IP cameras transmits video data to the server through a network, each of the multiple IP cameras cannot encrypt the video data if the processing power thereof is insufficient, so that the video data is transmitted to the server without applying encryption. Therefore, the security of the video data is compromised.

Even in the case where each of the multiple IP cameras uses SRTP to encrypt the video data and transmit the encrypted video data to the server, network transmission traffic may increase. A dedicated line may be used to reduce the network transmission traffic. However, this may increase the cost of the CCTV system.

In order to improve these disadvantages, Korean Registered Patent No. 10-2012037 (Patent Document 2) discloses that a compression/encryption device is provided in the CCTV system.

The compression/encryption device receives video data from an IP camera, compresses and encrypts the received video data, and transmits the encrypted video data to the server.

However, even when the compression/encryption device disclosed in Korean Registered Patent No. 10-2012037 is used, the IP camera does not encrypt the video data, so that the video data is transmitted to the compression/encryption device without applying encryption.

Therefore, the security of the video data is compromised between the IP camera and the compression/encryption device.

In addition, the cost may increase since it is necessary to additionally provide the compression/encryption device.

RELATED ART

Patent Document

Patent Document 1: Korean Patent Application Publication No. 10-2016-0069432

Patent Document 2: Korean Registered Patent No. 10-2012037

SUMMARY

It is an object of the technique of the present disclosure to provide a method for performing secure communication of data even with an apparatus having low processing power by encrypting (or decrypting) a random key using an encryption key and a first encryption scheme and encrypting (or decrypting) the data using the random key and a second encryption scheme having lower operation (computational) load compared to the first encryption scheme.

In view of the above, according to one aspect of the technique of the present disclosure, there is provided a method for securely communicating data, which is performed by an apparatus, the method including: (a) establishing a first encryption scheme, a data integrity checking scheme, an encryption key and an authentication key through a communication connection with a receiver; (b) generating a random key; (c) generating secure data including random key information obtained by encrypting the random key using the encryption key and the first encryption scheme; authentication information generated based on the random key, the data integrity checking scheme and the authentication key; and data information obtained by encrypting data using the random key and a second encryption scheme that has lower operation load compared to the first encryption scheme; and (d) transmitting the secure data to the receiver.

According to another aspect of the technique of the present disclosure, there is provided a method for securely communicating data, which is performed by an apparatus, the method including: (a) establishing a first encryption scheme, a data integrity checking scheme, an encryption key and an authentication key through a communication connection with a transmitter; (b) receiving secure data including random key information, authentication information and data information from the transmitter; (c) obtaining a random key by decrypting the random key information using the encryption key and the first encryption scheme; (d) authenticating the random key by comparing the authentication information with receiver-side authentication information that is generated based on the random key, the data integrity checking scheme and the authentication key; and (e) obtaining, when the random key is authenticated, data by decrypting the data information using the random key and a second encryption scheme whose operation load is lower than that of the first encryption scheme.

According to the technique of the present disclosure, it is possible to provide the method for performing secure communication of data even with the apparatus having low processing power by encrypting (or decrypting) the random key using the encryption key and the first encryption scheme and encrypting (or decrypting) the data using the random key and the second encryption scheme having comparatively lower operation (computational) load compared to the first encryption scheme.

Further, according to the technique of the present disclosure, by using the random key that is generated at random time intervals, it is possible to perform the secure communication of data even when using the second encryption scheme.

In addition, according to the technique of the present disclosure, since the data is encrypted (or decrypted) by using the second encryption scheme, the increase in network traffic can be minimized, allowing the secure communication of data between multiple apparatuses on a many-to-many basis.

DETAILED DESCRIPTION

Hereinafter, one or more embodiments (also simply referred to as "embodiments") of the method for securely communicating data according to the technique of the present disclosure will be described mainly with reference to the drawings. Meanwhile, in the drawings for describing the embodiments of the technique of the present disclosure, for the sake of convenience of description, only a part of the practical configurations may be illustrated or the practical configurations may be illustrated while a part of the practical configurations is omitted or changed. Further, relative dimensions and proportions of parts therein may be exaggerated or reduced in size.

First Embodiment

Figure 1:
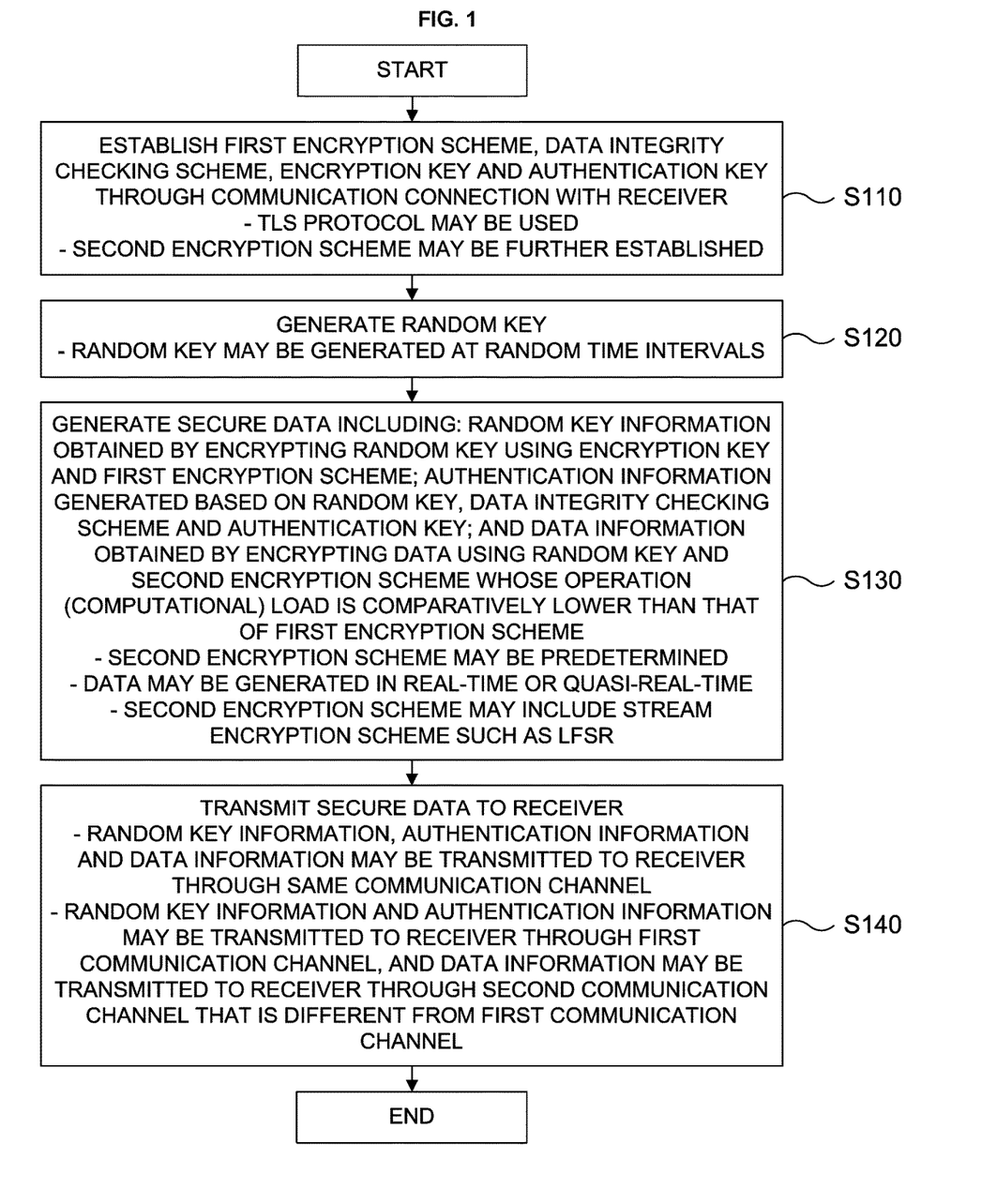
FIG. 1 is a flowchart schematically illustrating a method for securely communicating data according to a first embodiment of the technique of the present disclosure.
Figure 2:
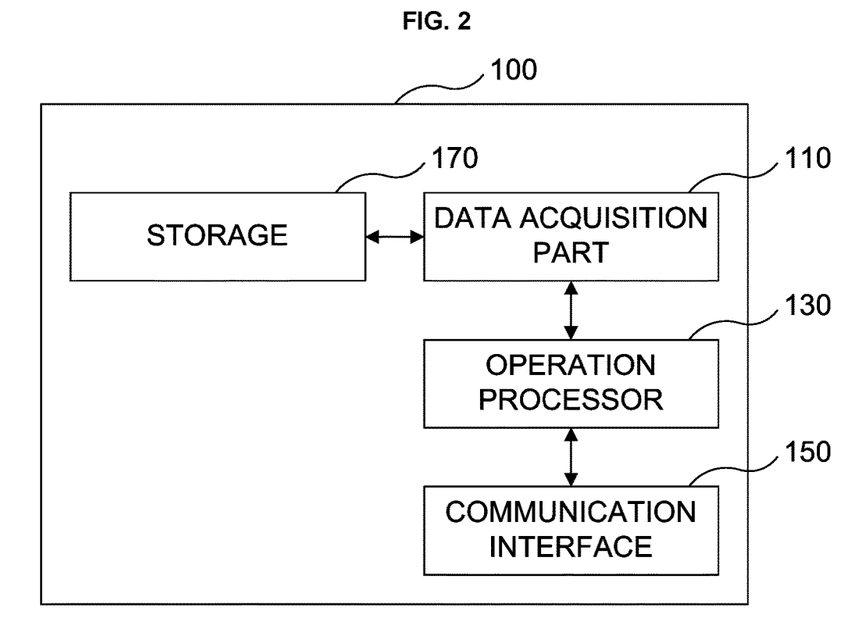
FIG. 2 is a diagram illustrating an exemplary configuration of an apparatus performing the method for securely communicating data according to the first embodiment of the technique of the present disclosure.
Figure 3:
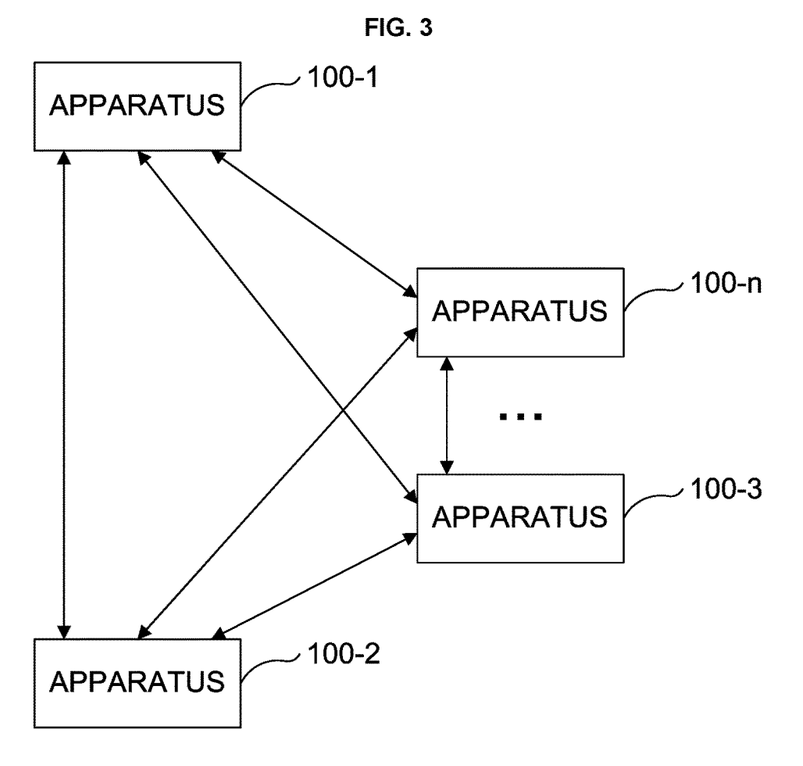
FIG. 3 is a diagram illustrating an example of a system environment in which the method for securely communicating data according to the first embodiment of the technique of the present disclosure is employed.

FIG. 1 is a flowchart schematically illustrating a method for securely communicating data according to a first embodiment of the technique of the present disclosure, FIG. 2 is a diagram illustrating an exemplary configuration of an apparatus performing the method for securely communicating data according to the first embodiment of the technique of the present disclosure, and FIG. 3 is a diagram illustrating an example of a system environment in which the method for securely communicating data according to the first embodiment of the technique of the present disclosure is employed.

Referring first to FIG. 2, there will be described an apparatus 100 implementing the method for securely communicating data according to the first embodiment of the technique of the present disclosure.

Referring to FIG. 2, the apparatus 100 performing the method for securely communicating data may include a data acquisition part 110, an operation processor 130 and a communication interface 150. The apparatus 100 may further include a storage 170.

The apparatus 100 may be implemented using, for example, a computing device having data acquisition capabilities, computing capabilities and communication capabilities. For example, the apparatus 100 may be implemented using a computing device such as, but not limited to, an artificial intelligence speaker, an IP camera, a video conferencing device, or a personal computer.

The data acquisition part 110 is configured to acquire data, such as multimedia data. The data acquisition part 110 may be implemented using, but is not limited to, an image input device such as a camera or an audio input device such as a microphone. For example, the data acquisition part 110 may acquire data by reading data stored in the storage 170.

The operation processor 130 may be implemented using a semiconductor device, such as a central processing unit (CPU), an application specific integrated circuit (ASIC) or the like.

The operation processor 130 may be implemented using, for example, a plurality of semiconductor devices.

For example, the operation processor 130 may be implemented using a first semiconductor device performing a control function, a second semiconductor device performing encoding/decoding of data, and a third semiconductor device performing encryption/decryption of data.

The operation processor 130 is configured to execute the method for securely communicating data according to the first embodiment to be described below, and may control the data acquisition part 110 and the communication interface 150 to execute the method for securely communicating data according to the first embodiment.

The communication interface 150 is an internet-protocol-based communication interface. The communication interface 150 may be implemented using a semiconductor device such as a communication chip.

As described above, the apparatus 100 may further include the storage 170.

The storage 170 is configured to store data. The storage 170 may be implemented using a semiconductor device, such as a semiconductor memory, for example.

Next, referring to FIG. 3, there will be described an example of the system environment in which the method for securely communicating data according to the first embodiment of the technique of the present disclosure.

Referring to FIG. 3, a plurality of apparatuses, e.g., apparatuses 100-1 to 100-n are located in a network. Here, "n" is an integer greater than or equal to 2.

Although the specific configurations of the apparatuses 100-1 to 100-n may be different from each other, each of the apparatuses 100-1 to 100-n at least includes in common an operation processor and a communication interface that respectively correspond to the operation processor 130 and the communication interface 150 of the apparatus 100 described above. However, it is preferred that each of the apparatuses 100-1 to 100-n includes in common a data acquisition part, an operation processor and a communication interface that respectively correspond to the data acquisition part 110, the operation processor 130 and the communication interface 150 of the apparatus 100 described above.

In the case that each of the apparatuses 100-1 to 100-n includes in common the data acquisition part, the operation processor and the communication interface, each of the apparatuses 100-1 to 100-n may serve as both of a data transmitting apparatus (hereinafter referred to as a "transmitter") and a data receiving apparatus (hereinafter referred to as a "receiver").

In the case that some of the apparatuses 100-1 to 100-n do not include the data acquisition part, the apparatus having no data acquisition part may serve as the receiver and the apparatus having the data acquisition part may serve as both of the transmitter and the receiver.

The apparatus 100-1 may be in communication with one of the apparatuses 100-2 to 100-n.

For example, the apparatus 100-1 may communicate with the apparatus 100-2.

Alternatively, the apparatus 100-1 may be in communication with two or more of the apparatuses 100-2 to 100-n. For example, the apparatus 100-1 may communicate with all of the apparatuses 100-2 to 100-n. Further, alternatively, the apparatuses 100-1 to 100-n may communicate with each other on a many-to-many basis.

Each of the apparatuses 100-1 to 100-n may hereinafter be referred to as the apparatus 100.

Hereinafter, the method for securely communicating data according to the first embodiment of the technique of the present disclosure will be described in detail based on the case where the apparatus 100 operates as the transmitter.

Referring to FIG. 1, in step S110, the apparatus 100 establishes a first encryption scheme, a data integrity checking scheme, an encryption key and an authentication key through a communication connection with the receiver.

For example, the apparatus 100-1 establishes (sets) the first encryption scheme, the data integrity checking scheme, the encryption key and the authentication key through a communication connection with at least one of the apparatuses 100-2 to 100-n.

The first encryption scheme, the data integrity checking scheme, the encryption key and the authentication key set in the apparatus 100 are similar to the encryption scheme, the data integrity checking scheme, the encryption key and the authentication key used in the secured real-time transport protocol (SRTP) that are previously discussed. However, since the first encryption scheme, the data integrity checking scheme, the encryption key and the authentication key set in the apparatus 100 are applied particularly to a random key to be described later, they are different from the encryption scheme, the data integrity checking scheme, the encryption key and the authentication key used in SRTP that are applied to data.

Step S110 may be performed by using a transport layer security (TLS) protocol. That is, a communication connection is established between the apparatus 100 and the receiver by using the TLS protocol, during which a process such as a handshake may be performed.

In step S110, the apparatus 100 may further establish (set) a second encryption scheme. That is, step S110 may further include a step of setting the second encryption scheme.

The second encryption scheme will be described later.

Next, in step S120, the apparatus 100 generates a random key.

The random key is used to encrypt and decrypt data by using the second encryption scheme to be described later.

The random key may be generated at random time intervals. That is, step S120 may be executed at random time intervals. For example, the random key may be generated every few tens of milliseconds or every few seconds.

Next, in step S130, the apparatus 100 generates secure data including random key information obtained by encrypting the random key using the encryption key and the first encryption scheme set in step S110; authentication information generated based on the random key generated in step S120, the data integrity checking scheme set in step S110 and the authentication key set in step S110; and data information obtained by encrypting data using the random key and the second encryption scheme whose operation (computational) load is comparatively lower than that of the first encryption scheme.

The data may be generated in real-time or quasi-real-time.

For example, the apparatus 100 (e.g., a computing device such as an artificial intelligence speaker, an IP camera, a video conferencing device, or a personal computer) can generate data in real time.

The apparatus 100 generates the random key information by encrypting the random key using the encryption key and the first encryption scheme set in step S110. That is, unlike SRTP in which data is encrypted using an encryption key and an encryption scheme to generate an SRTP payload, the apparatus 100 encrypts the random key using the encryption key and the first encryption scheme set in step S110 to generate the random key information. It is also possible to say that the random key information has a format similar to the SRTP payload, except that the random key is encrypted.

Further, the apparatus 100 generates the authentication information based on the random key generated in step S120, the data integrity checking scheme set in step S110 and the authentication key set in step S110. That is, unlike SRTP in which an authentication tag is generated by converting an SRTP packet based on an authentication key and an authentication function, the apparatus 100 generates the authentication information based on the random key, the data integrity checking scheme and the authentication key. It is also possible to say that the authentication information has a format similar to the authentication tag in SRTP, except that the authentication information is generated based on the random key.

Further, the apparatus 100 generates the data information by encrypting the data using the random key and the second encryption scheme that has comparatively lower operation (computational) load compared to the first encryption scheme.

The second encryption scheme is an encryption scheme used to encrypt and decrypt data, which is different from the first encryption scheme. Specifically, the operation (computational) load for executing the second encryption scheme is lower than the operation (computational) load for executing the first encryption scheme.

The second encryption scheme may be set in step S110 described above. Alternatively, the second encryption scheme may be determined in advance. For example, the second encryption scheme may be predetermined and stored in the apparatus 100 instead of being set through step S110 described above.

As an example of the second encryption scheme, a lightweight encryption algorithm may be used. Further, as an example of the lightweight encryption algorithm, an encryption algorithm such as a SEED algorithm developed by the Korea Internet & Security Agency (KISA) may be used.

As another example of the second encryption scheme, a stream encryption scheme may be used. In that case, the random key includes a key that is used in the stream encryption scheme.

As an example of the stream encryption scheme, an encryption scheme using a linear-feedback shift register (LFSR) may be used.

In other words, data can be encrypted by shifting the data using LFSR.

The apparatus 100 generates the secure data including the random key information, the authentication information and the data information.

Figure 4:
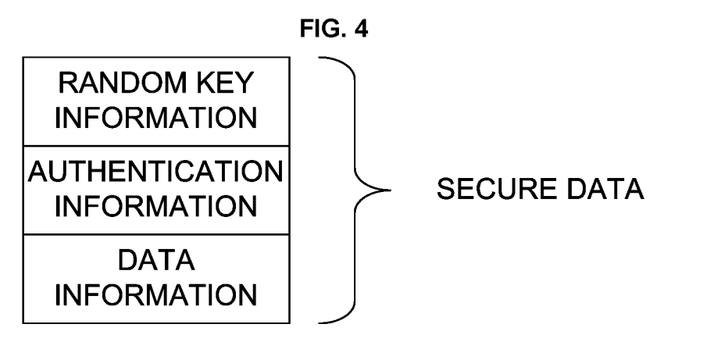
FIGS. 4 and 5 are diagrams illustrating examples of secure data generated in accordance with the method for securely communicating data according to the first embodiment of the technique of the present disclosure.
Figure 5:
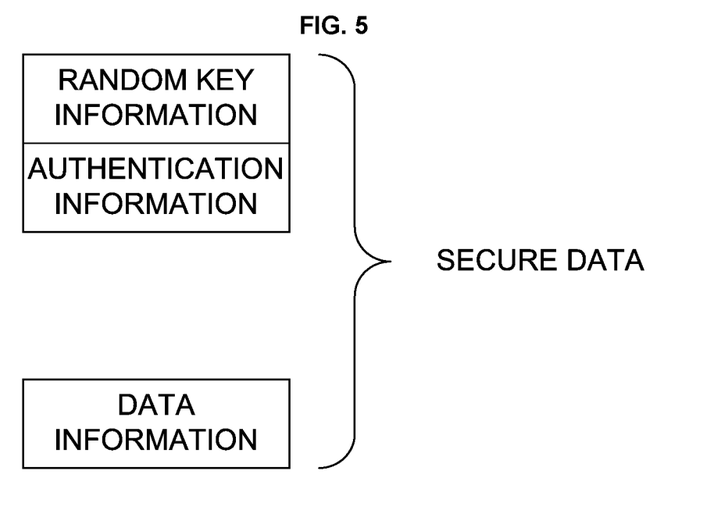

FIGS. 4 and 5 are diagrams illustrating examples of the secure data generated by the method for securely communicating data according to the first embodiment of the technique of the present disclosure.

Referring to FIG. 4, the secure data may be structured in a format in which the random key information, the authentication information and the data information are coupled with each other.

Referring to FIG. 5, the secure data may be structured in a format that includes first secure data in which the random key information and the authentication information are coupled with each other, and the data information that is separate from the first secure data.

The first secure data shown in FIG. 5 may be structured in a format that is similar to an SRTP packet. That is, while the SRTP payload and the authentication tag are coupled with a real-time transport protocol (RTP) header in the SRTP packet, the first secure data may be structured in a format of a packet in which the random key information and the authentication information are coupled with the RTP header. The data information may be appended with a header to match the data information with the random key.

Next, referring back to FIG. 1, in step S140, the apparatus 100 transmits the secure data generated in step S130 to the receiver.

For example, the apparatus 100 may transmit the random key information, the authentication information and the data information to the receiver through the same communication channel.

For example, if the secure data is structured in the format in which the random key information, the authentication information and the data information are coupled as shown in FIG. 4, the apparatus 100 may transmit the secure data to the receiver through the same communication channel.

Alternatively, the apparatus 100 may transmit the random key information and the authentication information to the receiver through a first communication channel and transmit the data information to the receiver through a second communication channel that is different from the first communication channel.

For example, if the secure data is structured in a format that includes the first secure data and the data information as shown in FIG. 5, the apparatus 100 may transmit the first secure data to the receiver through the first communication channel and transmit the data information to the receiver through the second communication channel.

According to the first embodiment described above, the random key is encrypted using the encryption key and the first encryption scheme, and the data is encrypted using the random key and the second encryption scheme whose operation (computational) load is lower than that of the first encryption scheme. Consequently, the secure communication of data can be achieved even with an apparatus having low processing power.

In other words, SRTP encrypts all data by using computationally intensive encryption schemes, which increases the operation (computational) load on the apparatus and, consequently, the size of the encrypted data.

However, according to the first embodiment, the operation load of the apparatus can be minimized and the size of the resulting encrypted data can be minimized because only small-sized data such as random keys are encrypted by the first encryption scheme having high operation load, and large-sized data are encrypted by the second encryption scheme having low operation load.

Thus, the method of securely communicating data according to the first embodiment can also be applied to many-to-many connections between multiple apparatuses.

In addition, the security level can be increased by using the random key that is generated at random time intervals.

Furthermore, in the case when the random key information and the authentication information are transmitted through the first communication channel and the data information is transmitted through the second communication channel, communication efficiency can be improved.

Second Embodiment

The first embodiment has been described based on the case where the apparatus 100 serves as the transmitter.

Hereinafter, a method for securely communicating data according to a second embodiment of the technique of the present disclosure will be described in detail based on the case where the apparatus 100 serves as the receiver.

The apparatus 100 that performs the method for securely communicating data according to the second embodiment and the system environment in which the method for securely communicating data according to the second embodiment is used are substantially the same as those in the first embodiment described above. Thus, detailed descriptions thereof will be omitted.

Further, in describing the method for securely communicating data according to the second embodiment of the technique of the present disclosure, redundant description that has been made in the above-described first embodiment will be omitted.

Figure 6:
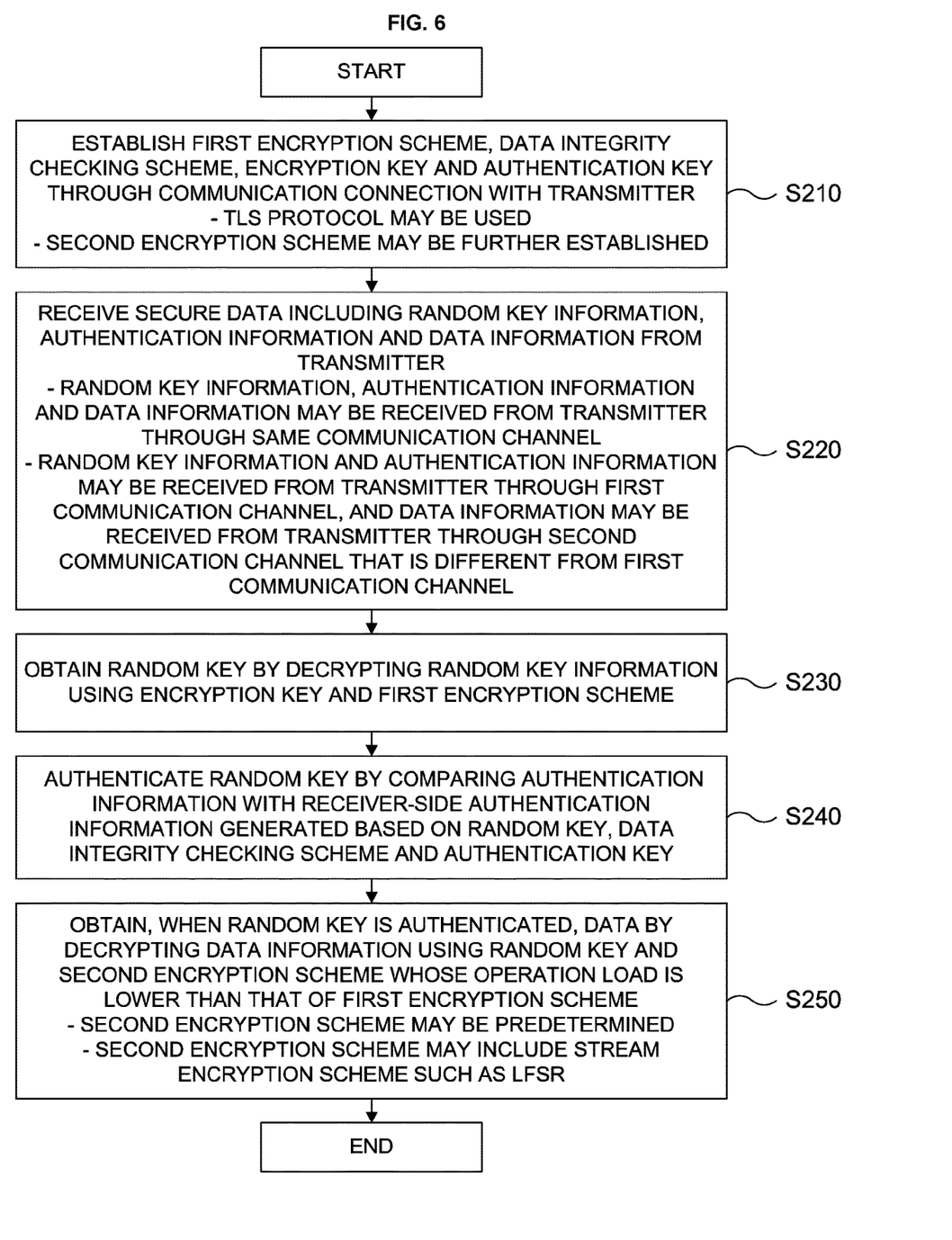
FIG. 6 is a flowchart schematically illustrating a method for securely communicating data according to a second embodiment of the technique of the present disclosure.

FIG. 6 is a flowchart schematically illustrating the method for securely communicating data according to the second embodiment of the technique of the present disclosure.

Referring to FIG. 6, in step S210, the apparatus 100 establishes a first encryption scheme, a data integrity checking scheme, an encryption key and an authentication key through a communication connection with the transmitter.

Step S210 may be performed by using the TLS protocol. That is, a communication connection is established between the apparatus 100 and the transmitter by using the TLS protocol, during which a process such as a handshake may be performed.

In step S210, the apparatus 100 may further establish (set) a second encryption scheme. That is, step S210 may further include a step of setting the second encryption scheme.

Next, in step S220, the apparatus 100 receives secure data including random key information, authentication information and data information from the transmitter.

For example, the apparatus 100 may receive the random key information, the authentication information and the data information from the transmitter through the same communication channel.

Alternatively, the apparatus 100 may receive the random key information and the authentication information from the transmitter through a first communication channel and receive the data information from the transmitter through a second communication channel that is different from the first communication channel.

The details of the secure data have been discussed in the first embodiment described above. Thus, detailed descriptions thereof will be omitted.

Next, in step S230, the apparatus 100 obtains a random key by decrypting the random key information received in step S220 using the encryption key and the first encryption scheme set in step S210.

Next, in step S240, the apparatus 100 authenticates the random key by comparing the authentication information received in step S220 with the receiver-side authentication information generated based on the random key obtained in step S330, the data integrity checking scheme set in step S210 and the authentication key set in step S210.

Next, in step S250, once the random key is authenticated in step S240, the apparatus 100 obtains the data by decrypting the data information using the random key and the second encryption scheme whose lower operation (computational) load is comparatively lower than that of the first encryption scheme.

As described above, the second encryption scheme is an encryption scheme used to encrypt and decrypt data, and the second encryption scheme is different from the first encryption scheme. Specifically, the operation (computational) load for executing the second encryption scheme is lower than the operation (computational) load for executing the first encryption scheme.

The second encryption scheme may be set in step S210 described above. Alternatively, the second encryption scheme may be determined in advance. For example, the second encryption scheme may be predetermined and stored in the apparatus 100 instead of being set through step S210 described above.

As an example of the second encryption scheme, a lightweight encryption algorithm may be used. Further, as an example of the lightweight encryption algorithm, an encryption algorithm such as a SEED algorithm developed by the Korea Internet & Security Agency (KISA) may be used.

As another example of the second encryption scheme, a stream encryption scheme may be used. In that case, the random key includes a key that is used in the stream encryption scheme.

As an example of the stream encryption scheme, an encryption scheme using a linear-feedback shift register (LFSR) may be used.

In other words, data can be encrypted by shifting the data using LFSR.

According to the second embodiment described above, the random key is decrypted using the encryption key and the first encryption scheme, and the data is decrypted using the random key and the second encryption scheme whose operation (computational) load is lower than that of the first encryption scheme. Consequently, the secure communication of data can be achieved even with an apparatus having low processing power.

In other words, SRTP decrypts all data by using computationally intensive encryption schemes, which increases the operation (computational) load on the apparatus.

However, according to the second embodiment, the operation load of the apparatus can be minimized because only small-sized data such as random keys are decrypted by the first encryption scheme having the high operation load, and large-sized data are decrypted by the second encryption scheme having the low operation load.

Thus, the method of securely communicating data according to the second embodiment can also be applied to many-to-many connections between multiple apparatuses.

In addition, the security level can be increased by using the random key that is generated at random time intervals.

Furthermore, in the case when the random key information and the authentication information are received through the first communication channel and the data information is received through the second communication channel, communication efficiency can be improved.

Other Embodiments

While the technique of the present disclosure is described in detail by way of the embodiments described above, the technique of the present disclosure is not limited thereto and may be modified in various ways without departing from the scope thereof.

For example, the technique of the present disclosure may be applied to an apparatus.

For example, an apparatus according to the technique of the present disclosure may include an operation processor that is configured to (a) establish a first encryption scheme, a data integrity checking scheme, an encryption key and an authentication key through a communication connection with a receiver; (b) generate a random key; (c) generate secure data including random key information obtained by encrypting the random key using the encryption key and the first encryption scheme; authentication information generated based on the random key, the data integrity checking scheme and the authentication key; and data information obtained by encrypting data using the random key and a second encryption scheme that has lower operation load compared to the first encryption scheme; and (d) transmit the secure data to the receiver.

Accordingly, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

INDUSTRIAL APPLICABILITY

As described above, according to some embodiments of the technique of the present disclosure, it is possible to provide the method for performing secure communication of data even with the apparatus having low processing power by encrypting (or decrypting) the random key using the encryption key and the first encryption scheme and encrypting (or decrypting) the data using the random key and the second encryption scheme whose operation (computational) load is comparatively lower than that of the first encryption scheme.

Further, according to some embodiments of the technique of the present disclosure, by using the random key that is generated at random time intervals, it is possible to perform the secure communication of data even when using the second encryption scheme.

In addition, according to some embodiments of the technique of the present disclosure, since the data is encrypted (or decrypted) by using the second encryption scheme, the increase in network traffic can be minimized, allowing the secure communication of data between multiple apparatuses on a many-to-many basis.

What is claimed is:

1. A method for securely communicating data, which is performed by an apparatus, the method comprising:
   (a) establishing a first encryption scheme, a data integrity checking scheme, an encryption key and an authentication key through a communication connection with a receiver;
   (b) generating a random key;
   (c) generating secure data including random key information obtained by encrypting the random key using the encryption key and the first encryption scheme; authentication information generated based on the random key, the data integrity checking scheme and the authentication key; and data information obtained by encrypting data using the random key and a second encryption scheme whose operation load is lower than that of the first encryption scheme; and
   (d) transmitting the secure data to the receiver.

2. The method of claim 1, wherein the data is generated in real-time or quasi-real-time.

3. The method of claim 1, wherein (a) is performed by using a transport layer security protocol.

4. The method of claim 1, wherein (a) includes (a-1) establishing the second encryption scheme through the communication connection.

5. The method of claim 1, wherein (b) is performed at random time intervals.

6. The method of claim 1, wherein the second encryption scheme is predetermined.

7. The method of claim 1, wherein the second encryption scheme includes a stream encryption scheme, and the random key includes a key that is used in the stream encryption scheme.

8. The method of claim 7, wherein the stream encryption scheme includes an encryption scheme using a linear-feedback shift register.

9. The method of claim 1, wherein (d) includes (d-1) transmitting the random key information, the authentication information and the data information to the receiver through a same communication channel.

10. The method of claim 1, wherein (d) includes (d-2) transmitting the random key information and the authentication information to the receiver through a first communication channel and transmitting the data information to the receiver through a second communication channel that is different from the first communication channel.

11. A method for securely communicating data, which is performed by an apparatus, the method comprising:
(a) establishing a first encryption scheme, a data integrity checking scheme, an encryption key and an authentication key through a communication connection with a transmitter;
(b) receiving secure data including random key information, authentication information and data information from the transmitter;
(c) obtaining a random key by decrypting the random key information using the encryption key and the first encryption scheme;
(d) authenticating the random key by comparing the authentication information with receiver-side authentication information that is generated based on the random key, the data integrity checking scheme and the authentication key; and
(e) obtaining, when the random key is authenticated, data by decrypting the data information using the random key and a second encryption scheme whose operation load is lower than that of the first encryption scheme.

12. The method of claim 11, wherein (a) is performed by using a transport layer security protocol.

13. The method of claim 11, wherein (a) includes (a-1) establishing the second encryption scheme through the communication connection.

14. The method of claim 11, wherein the second encryption scheme is predetermined.

15. The method of claim 11, wherein the second encryption scheme includes a stream encryption scheme, and the random key includes a key that is used in the stream encryption scheme.

16. The method of claim 15, wherein the stream encryption scheme includes an encryption scheme using a linear-feedback shift register.

17. The method of claim 11, wherein (b) includes (b-1) receiving the random key information, the authentication information and the data information from the transmitter through a same communication channel.

18. The method of claim 11, wherein (b) includes (b-2) receiving the random key information and the authentication information from the transmitter through a first communication channel and receiving the data information from the transmitter through a second communication channel that is different from the first communication channel.

* * * * *